US009421678B2

(12) United States Patent
Fiessler

(10) Patent No.: US 9,421,678 B2
(45) Date of Patent: Aug. 23, 2016

(54) FORMING DEVICE AND METHOD FOR THE OPERATION OF A FORMING DEVICE

(71) Applicant: Fiessler Elektronik GmbH & Co. KG, Esslingen (DE)

(72) Inventor: Lutz Fiessler, Aichwald (DE)

(73) Assignee: FIESSLER ELEKTRONIK GMBH & CO. KG, Esslingen (DE)

(*) Notice: Subject to any disclaimer, the term of this patent is extended or adjusted under 35 U.S.C. 154(b) by 678 days.

(21) Appl. No.: 13/846,080

(22) Filed: Mar. 18, 2013

(65) Prior Publication Data
US 2013/0269962 A1    Oct. 17, 2013

(30) Foreign Application Priority Data

Mar. 30, 2012    (EP) .................... 12002345

(51) Int. Cl.
| | | |
|---|---|---|
| *B21D 55/00* | (2006.01) | |
| *B25B 29/00* | (2006.01) | |
| *B30B 15/16* | (2006.01) | |
| *B23Q 17/24* | (2006.01) | |
| *F16P 3/14* | (2006.01) | |
| *F16M 13/02* | (2006.01) | |
| *B23Q 11/00* | (2006.01) | |
| *B23Q 16/12* | (2006.01) | |

(52) U.S. Cl.
CPC ............... *B25B 29/00* (2013.01); *B21D 55/00* (2013.01); *B23Q 17/24* (2013.01); *B30B 15/161* (2013.01); *F16M 13/022* (2013.01); *F16P 3/144* (2013.01); *B23Q 11/0078* (2013.01); *B23Q 16/12* (2013.01)

(58) Field of Classification Search
CPC ...... B21D 55/00; B30B 15/28; B30B 15/285; B30B 15/161; F16P 3/008; F16P 3/14; F16P 3/144; B23Q 11/0078; B23Q 16/12; B23Q 17/2208; B23Q 17/24; B23Q 17/2409; B23Q 17/2419; B23Q 17/2423; B23Q 17/2485; B23Q 17/249
See application file for complete search history.

(56) References Cited

U.S. PATENT DOCUMENTS

| | | | | |
|---|---|---|---|---|
| 4,907,432 A | * | 3/1990 | Maillefer | F16P 3/144 72/1 |
| 6,389,860 B1 | * | 5/2002 | Stalzer | B21D 55/00 192/134 |
| 6,677,574 B2 | * | 1/2004 | Fiessler | B30B 15/285 250/221 |
| 7,351,948 B2 | * | 4/2008 | Appleyard | B30B 15/285 192/116.5 |
| 7,454,935 B2 | * | 11/2008 | Braune | F16P 3/14 100/348 |
| 7,578,156 B2 | * | 8/2009 | Braune | F16P 3/144 72/31.11 |
| 8,103,373 B2 | * | 1/2012 | Davies | B21D 55/00 100/348 |
| 2012/0257276 A1 | * | 10/2012 | Tezuka | B23Q 17/2409 359/464 |

FOREIGN PATENT DOCUMENTS

| | | |
|---|---|---|
| DE | 19717299 | 2/1998 |
| DE | 20217426 | 1/2003 |
| DE | 102004058472 | 6/2006 |
| EP | 1327815 | 7/2003 |
| WO | WO9721182 | 6/1997 |
| WO | WO0192777 | 12/2001 |

* cited by examiner

*Primary Examiner* — Edward Tolan
(74) *Attorney, Agent, or Firm* — Hoffmann & Baron, LLP

(57) ABSTRACT

A forming device comprising a machine bed, a tool carrier supported on the machine bed in a manner capable of relative movement for mounting a tool, a drive device coupled to the tool carrier, a machine control unit and a monitoring device designed for monitoring movements of the tool carrier and for providing a shutdown signal to a disconnecting device located upstream of the drive device on the occurrence of a pre-settable monitoring case. It is provided that the machine control unit is designed in accordance with a first safety category of a safety standard, and that the monitoring device and the disconnecting device form a safe operating system designed in accordance with a second safety category of the safety standard, the second safety category being at a higher level than the first safety category within the safety standard.

7 Claims, 2 Drawing Sheets

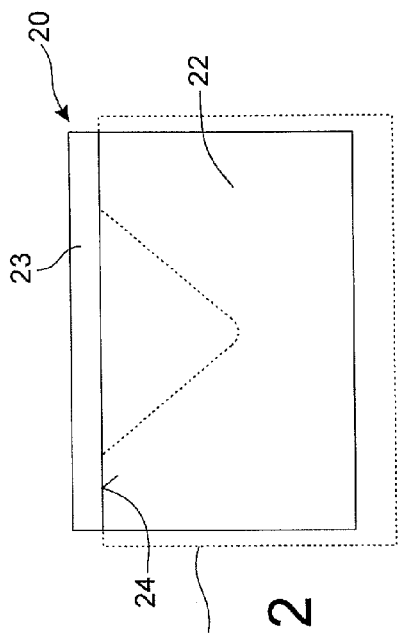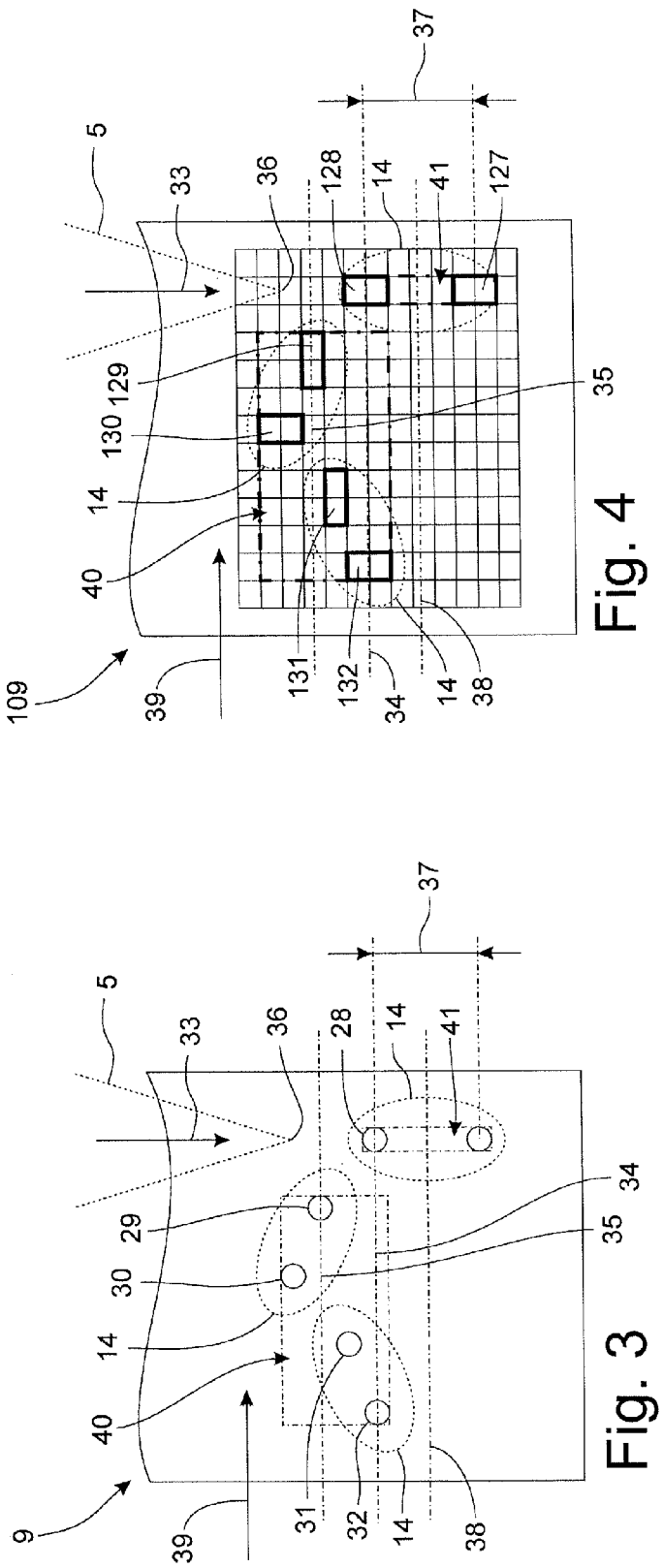

FORMING DEVICE AND METHOD FOR THE OPERATION OF A FORMING DEVICE

BACKGROUND OF THE INVENTION

The invention relates to a forming device comprising a machine bed, a tool carrier supported on the machine bed in a manner capable of relative movement for mounting a tool, a drive device coupled to the tool carrier, a machine control unit for the control of the drive device and a monitoring device designed for monitoring movements of the tool carrier and for providing a shutdown signal to a disconnecting device located upstream of the drive device on the occurrence of a pre-settable monitoring case, wherein the monitoring device comprises at least one radiation source and a plurality of radiation detectors arranged opposite the radiation source, and wherein at least a part of the beams emitted by the radiation source is oriented along a working edge of the tool. The invention further relates to a method for operating a forming device.

DE 102004058472 A1 discloses a safety device and a method for determining a coast-down distance in a machine in which a first machine part performs a working movement against a second machine part. The machine in question comprises at least a first and a second optical barrier. In the working movement, the two optical barriers move with the first machine part. In this process, the first optical barrier moves in advance of the first machine part at a first distance and the second optical barrier is arranged at a second distance from the first optical barrier. There is further a control unit which is designed to stop the working movement of the first machine part if the first optical barrier is interrupted. A checking unit and a blocking unit are further provided, wherein the checking unit is used to check whether the second optical barrier is interrupted after a stop of the first machine part. The blocking unit is used to block the working movement as a function of the checking result of the checking unit.

DE 102004058472 A1 refers to DE 202 17 426 U1, which deals with the determination of the coast-down distance of the tool after the disconnection of the drive device and for this purpose discloses the use of a CNC control and the associated position sensing system. DE 102004058472 A1 considers the disadvantage of this procedure to be the considerable effort and cost involved in the reliable determination and monitoring of the coast-down distance, if the relevant safety standards, in particular those of EN 954-1, are to be met.

SUMMARY OF THE INVENTION

The invention is based on the problem of providing a forming device and a method for operating a forming device in which a safety-oriented disconnection of the drive device in the monitoring case can be achieved with low engineering effort.

For a forming device of the type referred to above, this problem is solved by the features of claim 1 according to a first aspect of the invention. In this solution, it is provided that the monitoring device is designed to check the actual position of the tool carrier on receipt of a test signal to be provided by the machine control unit and to output a shutdown signal to the disconnecting device if there is a deviation from a predetermined checking result.

As a result, the monitoring device can, in addition to its basic function, i.e. the monitoring of user intervention in a predetermined safety and danger zone, be used to check an actual position of the tool carrier. This is particularly useful if the tool carrier and the tool mounted thereon are to move as close as possible to the workpiece at maximum speed and the tool carrier is to be brought to a stop immediately before the tool contacts the workpiece in order to provide the fastest possible machining process for the workpiece. For this purpose, the machine control unit provides a test signal when the tool carrier, in the opinion of the machine control unit, has reached a position in which a pre-settable checking result is determined by the monitoring device, provided that the tool carrier is indeed in the position determined by the machine control unit. If this is not the case, because the tool carrier has not yet reached this position or has already passed it, the monitoring device outputs a shutdown signal to the disconnecting device, because in this case a malfunctioning of the machine control unit has to be assumed and the continued safe operation of the forming device cannot be guaranteed.

Advantageous further developments of the invention are the subject matter of the dependent claims.

In one embodiment of the invention, it is provided that the machine control unit is designed in accordance with a first safety category of a safety standard and that the monitoring device and the disconnecting device form a safe operating system designed in accordance with a second safety category of the safety standard, the second safety category being at a higher level than the first safety category within the safety standard.

Examples for available safety standards include national or international standards such as EN ISO 13849-1 or EN/IEC 62061; these for example specify requirements applying to the reliability and/or to a defined behaviour of machines and machine components in the monitoring case and usually assign the operational reliability and fail-safety of the components to clearly definable safety classes or categories. A component which is to be assigned to a specific safety category of a safety standard has to be checked and possibly certified by the manufacturer and/or by an independent testing institution to determine whether it meets all the requirements of the respective safety standard. In practical operation, this may for example mean that the components which are to be assigned to the higher safety category are more reliable and therefore less likely to fail than components which are to be assigned to the lower safety category.

The design of machine components to meet the requirements of the intended safety category can involve a considerable effort in the design and production of these components and possibly in their integration into the respective machine, with adverse effects on the manufacturing costs of the machine. It is therefore expedient to design a minimum number of machine components for a high safety category of a safety standard, while the remaining machine components are produced to a lower safety category and therefore more cheaply.

According to the invention, the system boundaries for the safe working system are drawn tightly around the group of components of the forming device which are designed in accordance with a common high safety category, in order to keep the components within the safe working system and thus the costs of the safe working system low.

In the present case, only the monitoring device, which monitors the movement of the tool carrier relative to the machine bed, and the disconnecting device, which is designed to disconnect the energy supply for the drive device in a monitoring case, are treated as parts of the safe working system. The monitoring device is preferably designed as an independent component which can be retrofitted to an existing forming device without necessitating major interference with the machine control unit. In a particularly preferred embodiment, the monitoring device is manually or electrically adjustable on the tool carrier provided for mounting a tool and is designed for communication with the machine control unit. As a result, for example, tool-specific characteristics, such as an expansion of the tool or an expansion of a mating tool to be secured to the machine bed along the closing direction of the tool with respect to the mating tool, or even the material thickness of the workpiece to be machined, can be made available to the monitoring device, in order to position it on the tool carrier along the closing direction in a suitable way.

It is expedient if the machine control unit comprises a position sensing system for determining a relative position between the tool carrier and the machine bed and for providing a test signal on reaching a pre-settable relative position while the tool carrier approaches the machine bed. With the aid of the position sensing system, the position of the tool carrier along the closing direction relative to the machine bed or to a mating tool which can be fitted to the machine bed can be controlled in an open or closed loop; for simplicity, the following explanations are restricted to the term of the machine bed, which should include the mating tool, if provided. According to the invention, it is provided that the position sensing system and the machine control unit are, within the meaning of the safety standard on which the conception of the forming device is based, individually not safe enough to ensure that the forming device operates in a way in which injuries to an operator can be excluded with the certainty required by the safety standard. Accordingly, the machine control unit is primarily provided for the open- or closed-loop control of the forming process, but not for its safety-relevant monitoring. With respect to safety functions aimed at preventing injuries to an operator with the certainty required by the safety standard, the machine control unit contributes insofar as a test signal is provided for the monitoring device when a pre-settable relative position is reached while the tool carrier approaches the machine bed. This test signal is to be assigned to the safety category which the machine control unit adopts within the safety standard. As, according to the invention, the safety category of the machine control unit is lower than the safety category of the monitoring device, the test signal is colloquially called "uncertain". The test signal is used to trigger in the monitoring device a checking step to be performed within the safety category of the monitoring device, by means of which checking step a statement can be made with regard to the actual position of the tool carrier relative to the machine bed. This statement is made on the level of the safety category of the monitoring device and is therefore colloquially called a "certain" statement.

In a further development of the invention, it is provided that the radiation detectors of the monitoring device, which are arranged opposite the radiation source and which are designed to detect the beams oriented along the working edge of the tool fitted to the tool carrier, are configured at least in pairs for the detection of a beam. This means that the radiation source can be kept simple, because rays are applied by a beam to at least two radiation detectors arranged at a distance from one another. In a particularly advantageous embodiment, there is an at least paired utilisation of a beam by two or more radiation detectors if beams are provided by discrete radiation sources, in particular laser diodes. Relative to the working edge, the beams are preferably arranged in such a way that the entry of a body part, in particular a hand, of an operator into a danger zone defined by the tool and the machine bed can be detected. The danger zone is usually a substantially rectangular section which extends from the working edge of the tool in the closing direction up to the machine bed and which becomes smaller during a working movement of the tool relative to the machine bead, so that there is a risk that body parts could be trapped. The monitoring device is preferably designed both for monitoring the danger zone and for monitoring a safety zone adjoining the danger zone and extending at right angles to the closing movement direction. In its dimension transverse to the closing movement direction, this safety zone is preferably variable. The dimension of the safety zone in this direction preferably varies as a function of the distance between tool and machine bed and/or as a function of the speed with which the tool moves relative to the machine bed. The dimension of the safety zone is determined by the arrangement of the radiation detectors, the monitoring device taking into account the signals of the individual radiation detectors.

It is advantageous if a first radiation detector is arranged along a closing movement direction at a distance from the working edge of the tool which at least corresponds to a coast-down distance of the tool carrier following a disconnection of the drive device at a first speed of movement, in particular a fast traverse. The first radiation detector has the task of ensuring a safe disconnection of the drive device within the coast-down distance, i.e. the braking distance which the drive device requires for bringing the tool carrier from the first speed of movement to a standstill. For example, it has to be ensured that, if the beam applied to the first radiation detector is interrupted, for example by the hand of a user which enters the danger zone, the tool carrier can be brought to a standstill fast enough for the hand of the user not to be caught between the tool and the machine bed.

A second radiation detector is preferably arranged along the closing movement direction at a distance from the working edge of the tool which at least corresponds to a sum of the coast-down distance of the tool carrier following a disconnection of the drive device at fast traverse and a pre-settable safety margin. The second radiation detector at least has the task of allowing a check of the position of the tool carrier and the monitoring device, which is motion-coupled thereto, at a pre-settable point in time during a movement of the tool carrier in the closing movement direction. As the second radiation detector, being a part of the monitoring device, is assigned to a higher safety category than the machine control unit, a certain statement on the position of the tool carrier can be derived from the combination of the signals of the first and second radiation detectors without having to assign the position sensing system of the machine control unit to the higher safety category. On the contrary, it is enough if the monitoring device can, at the time when the test signal is provided by the machine control unit, check whether the assumption of the machine control unit that the tool still has a pre-settable distance from the machine bed conforms to reality. Provided that there is an agreement between the assumption regarding the position of the tool carrier as made by the machine control unit on the "uncertain" level and the actual position of the tool carrier as determined by the monitoring device on the "certain" level, a continued operation of the forming device can be envisaged. Failing this, the monitoring device will output a shutdown signal to the disconnecting device provided upstream of the drive device, because the occurrence of a pre-settable monitoring case has to be assumed.

For this purpose, the monitoring device is designed for the provision of the shutdown signal to the disconnecting device provided upstream of the drive device for the cases in which no rays of a beam are applied to the first radiation detector on the arrival of the test signal and/or in which rays of a beam are applied to the second radiation detector on the arrival of the test signal. The provision of the shutdown signal in this case is based on the consideration that the pre-settable safety margin adopted by the second radiation detector with respect to the first radiation detector is dimensioned such that at the time of the provision of the test signal the tool carrier and the monitoring device, which is motion-coupled thereto, are in a position relative to the machine bed in which the beam, the rays of which can be applied both to the first and to the second radiation detector, impinges only on the first radiation detector, while the second radiation detector is already covered by the machine bed and is therefore not hit by rays. In this context, the arrangement of the two radiation detectors is chosen such that the condition described above (rays applied to the first but not to the second radiation detector) is present only within a narrow position range for an actual position of the tool carrier and the monitoring device, which is motion-coupled thereto. If at the time of the provision of the test signal by the machine control unit this position range is not yet reached or already exceeded, a malfunction of the machine control unit has to be assumed, necessitating a disconnection of the drive device by a suitable selection of the disconnecting device.

According to a second aspect, the problem of the invention is solved by a method for operating a forming device according to any of claims 1 to 7. The method provides for the following steps: the carrying out of an approach movement of the tool carrier towards the machine bed at a first speed of movement, the monitoring of an application of radiation to a plurality of radiation detectors by means of the monitoring device, wherein a first radiation detector is along a closing movement direction of the tool carrier arranged at a distance from the working edge of the tool which corresponds to a coast-down distance of the tool carrier following a disconnection of the drive device from the first speed of movement, the determination of a position of the tool carrier along the closing movement direction by the machine control unit and the provision of a test signal by the machine control unit to the monitoring device on reaching a pre-settable relative position determined by the machine control unit, the monitoring of the radiation applied to the radiation detectors, wherein a second radiation detector is arranged along the closing movement direction at a distance from the working edge of the tool which corresponds to a sum of the coast-down distance of the tool carrier following a disconnection of the drive device from the first speed of movement and a pre-settable safety margin, and the provision of the shutdown signal to the disconnecting device provided upstream of the drive device if at the time of the provision of the test signal no radiation of the beam is applied to the first radiation detector and/or if at the time of the provision of the test signal radiation of the beam is applied to the second radiation detector.

In a further development of the method, it is provided that, prior to the provision of the test signal, a failure of radiation onto at least one of the radiation detectors results in the provision of the shutdown signal to the disconnecting device provided upstream of the drive device, the second radiation detector being ignored. If at least one of the radiation detectors cannot detect any rays of the associated beam before the provision of the test signal, an intervention of the user in the danger zone or in the safety zone has to be assumed, necessitating the fastest possible deceleration of the closing movement of the tool carrier if the operator is not to be endangered.

In a further development of the method, it is provided that, following the provision of the test signal by the machine control unit for the monitoring device, the drive device is decelerated to a second, lower speed of movement if radiation of the beam is applied to the first radiation detector at the time of the provision of the test signal and if no radiation of the beam is applied to the second radiation detector at the time of the provision of the test signal. According to the invention, the test signal is provided by the machine control unit if the machine control unit, on the basis of the available information, which is "uncertain" according to the safety category of the machine control unit and the associated position sensing system, has to assume that the tool is still positioned at a distance from the workpiece to be formed which at least corresponds to the coast-down distance. Insofar as this assumption of the machine control unit can be confirmed by the monitoring device by scanning the first and second radiation detectors and by determining a signal pattern corresponding to expectations, a deceleration of the tool carrier from the first to the second speed of movement is initiated to ensure that the tool, on contacting the workpiece, has reliably reached the second speed of movement, which is advantageous for forming the workpiece. If the signal pattern determined by the monitoring device does not correspond to expectations, because at the time of the provision of the test signal rays are applied neither to the first nor to the second radiation detector, or rays are applied to both radiation detectors, or rays are applied to the second radiation detector only, a malfunction of the machine control unit has to be assumed and the drive device has to be disconnected.

In a further development of the method, it is provided that, at the start of the deceleration to the second speed of movement, those radiation detectors which are arranged in a common plane oriented at right angles to the closing movement direction with the first radiation detector are deactivated. The deactivation of the radiation detectors is also known under the term of "fadeout", because from the time of the deactivation of the respective radiation detector, the monitoring device no longer determines whether or not radiation is applied to the radiation detector, because in terms of safety this is no longer necessary for the continued closing process between the tool carrier and the machine bed. As the first radiation detector and further radiation detectors located on the same plane are covered by the machine bed or by a workpiece lying on the machine bed immediately after the provision of the test signal, an unwanted disconnection of the drive device as a result of the interruption of the respective beams by the machine bed has to be prevented. This is achieved by deactivating the radiation detectors in question after a check by the monitoring device at the time of the provision of the test signal.

In a further development of the method, it is provided that, at the start of the deceleration to the second speed of movement, at least one radiation detector located in a second plane parallel to the first plane and having a smaller distance from the working edge of the tool than the first plane is deactivated on expiry of a pre-settable period of time. The at least one radiation detector located in the second plane is used to monitor the safety zone or the danger zone after the provision of the test signal by the machine control unit. As a deceleration of the tool carrier after the provision of the test signal is provided for in any case, either for machining the workpiece or for bringing the forming device into a safe state, the requirements concerning the monitoring of the safety zone and the danger zone are less stringent from this point in time, so that a time-controlled monitoring by the at least one radiation detector located on the second plane, which is in particular located in the safety zone and therefore in front of the danger zone, is deemed sufficient for ensuring the required safety level.

In a further development of the method, it is provided that, following the provision of the test signal, the deactivated radiation detectors are no longer monitored and only a lack of rays on active radiation detectors results in the provision of the shutdown signal to the disconnecting device located upstream of the drive device.

In a further development of the method, it is provided that all radiation detectors are deactivated on reaching the second speed of movement. The second speed of movement is chosen such that there is no need for further monitoring of the danger and/or the safety zone according to the currently relevant safety regulations. By way of example, the second speed of movement, which is also referred to as "creep speed", is between 10 mm per second and 20 mm per second.

In a further development of the method, it is provided that the determination of the pre-settable relative position at which the test signal is output by the machine control unit is performed in a lower safety category according to a specified safety standard than the checking of the application of rays to the first and second radiation detectors of the monitoring device, which falls into a higher safety category. The test signal is therefore output on the basis of data which relate to the less safe machine control unit and are therefore more likely to be faulty than the result of the check of the actual position of the tool carrier and the tool mounted thereon by means of the first and second radiation detectors, which are checked by the monitoring device. Notwithstanding this procedure, it is ensured that the use of the "uncertain" position signal of the machine control unit will never result in an unsafe state of the forming device, as explained below.

If the "uncertain" position signal is positively incorrect, i.e. if the machine control unit assumes a shorter distance between the tool carrier and the machine bed than is actually the case, the test signal is output at a time at which the second radiation detector is not yet covered by the machine bed. At this point in time, a check by the monitoring device establishes that rays of the beam are applied both to the first and to the second radiation detector. If the test signal is then provided, this results in the disconnection of the drive device by a signal of the monitoring device to the disconnecting device located upstream of the drive device, because the radiation detectors of the monitoring device do not provide the expected signal pattern on the arrival of the test signal.

If the "uncertain" position signal is negatively incorrect, i.e. if the machine control unit assumes a longer distance between the tool carrier and the machine bed than is actually the case, the first radiation detector is already covered before the provision of the test signal. This is followed by an immediate disconnection of the drive device by a signal of the monitoring device to the disconnecting device located upstream of the drive device.

Only if the machine control unit correctly detects the position of the tool carrier relative to the machine bed and therefore provides the test signal at a time when the first radiation detector is not yet covered by the machine bed while the second radiation detector is already covered by the machine bed, is the signal pattern of the two radiation detectors accepted as correct by the monitoring device, and the forming device is decelerated to the second speed of movement for deforming the workpiece.

BRIEF DESCRIPTION OF THE DRAWINGS

An advantageous embodiment of the invention is illustrated in the drawing. Of the drawing:

FIG. 2 is a side view of the safety device according to FIG. 1;

FIG. 3 is a side view of a first embodiment of a receiving device of the monitoring device; and FIG. 4 is a side view of a second embodiment of a receiving device of the monitoring device.

DETAILED DESCRIPTION OF THE PREFERRED EMBODIMENTS

Figure 1:
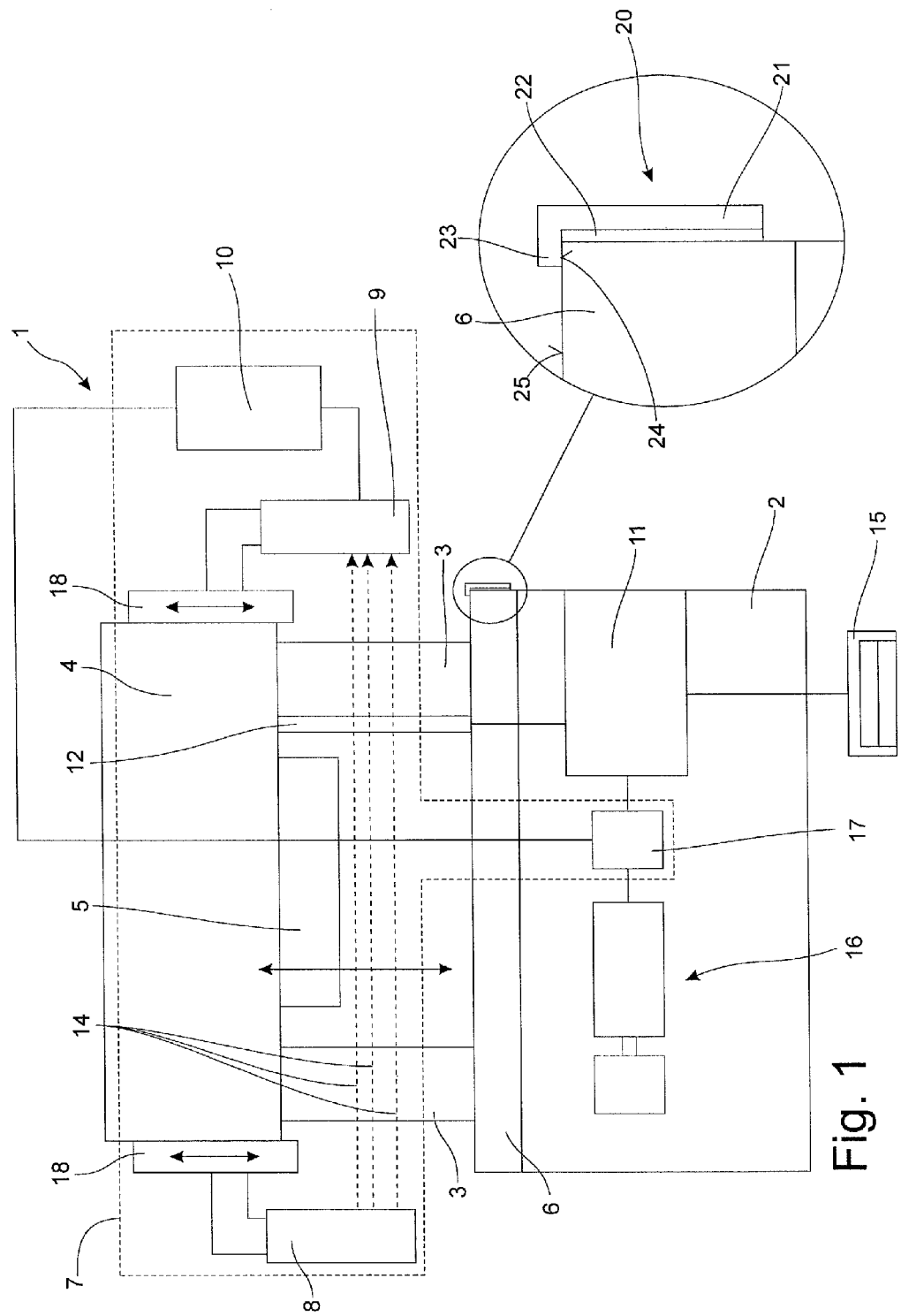
FIG. 1 is a diagrammatic representation of a die bending machine equipped with a monitoring device and a safety device mounted endwise on a die.

A forming machine illustrated in FIG. 1 as a die bending machine 1 by way of example comprises a machine bed 2 to which are attached two guide bars 3 designed to support a tool carrier 4 in linear motion. The tool carrier 4 can be moved along the guide bars 3 in a linear fashion in order to move a male die 5 serving as a tool relative to a female die 6. As the male die 5 moves in a closing movement direction, the gap between the male die 5 and the female die 6 is reduced, enabling a workpiece not shown in the drawing, which can be inserted into the gap between the male die 5 and the female die 6, to be deformed.

The die bending machine 1 is fitted with a monitoring device 7, which in the illustrated embodiment consists of several parts and which is provided in order to minimise the risk of injury by the die bending machine 1 and to ensure a fast and trouble-free machining process for the workpieces to be machined. In the illustrated embodiment, the monitoring device 7 comprises a light grid mounted on the tool carrier 4, the detection rays 14 of which are oriented parallel to a longest edge of the female die 6 and extend between a transmitting device 8 and a receiving device 9. The receiving device 9 of the light grid provides electric switching signals to an evaluation device 10 if detection rays 14 of the light grid are interrupted, the evaluation device 10 forming a further component of the monitoring device 7.

The die bending machine 1 comprises a machine control unit 11 which is electrically coupled to a position sensing system 12 and to a foot switch 15. By way of example, the machine control unit 11 may be designed as a computer numerical control (CNC). The machine control unit 11 allows the input of data concerning the geometries of the male die 5, the female die 6 and the workpiece, which is not shown in the drawing, as well as data concerning the desired deformation of the workpiece, and from these data determines the sequence of motions for the male die 5 with respect to the female die 6. The foot switch 15 is used by an operator to initiate this sequence of motions.

For initiating a movement of the tool carrier 4 and the male die 5 mounted thereon, the illustrated embodiment of the die bending machine 1 comprises an electrically driven hydraulic pump 16 which can provide a flow of oil to hydraulic cylinders not shown in the drawing, which are assigned to the guide bars 3. To provide the required electric energy, the hydraulic pump 16 is electrically connected to the machine control unit 11. For a safe operation of the hydraulic pump 16, a disconnecting device 17 is looped into the connection to the machine control unit 11; this can be selected by the evaluation device 10 and likewise forms a component of the monitoring device 7.

For adapting the position of the light grid, i.e. the transmitting device 8 and the receiving device 9, to different male dies 5, the transmitting device 8 and the receiving device 9 are mounted on the tool carrier 4 for linear movement by means of guide means 18. The guide means 18 for the transmitting device 8 and the receiving device 9 are preferably motion-coupled to one another in such a way that a synchronous adjustment of the two guide means 18 is ensured.

For a sequence of motions for the tool carrier 4 and the mounted male die 5 under the supervision of the monitoring device 7, it is provided that an interrupted lowest detection ray 14 and interrupted higher-placed detection rays 14 are detected on reaching a pre-settable relative position of the male die 5 with respect to the female die 6 mounted on the machine bed 2 and the workpiece lying on the female die 6, which is not shown in the drawing. If the detection rays 14 impinge on the receiving device 9 as described above, a correct position of the male die 5 relative to the female die 6 can be assumed, which is checked by means of the monitoring device. By way of example, the female die 6 shown in FIG. 2 has a V-shaped groove-like recess 19, which is not shown in detail and which ensures a free passage for the lowest detection ray 14 until the groove bottom is reached. In order to be able nevertheless to ensure the interruption of the lowest detection ray 14 in the desired pre-settable relative position of the male die 5 with respect to the female die 6, a safeguarding device 20 is fitted to an end face of the female die 6 to interrupt lowest detection ray 14 of the monitoring device 7 in the pre-settable relative position as the male die 5 approaches the female die 6.

As the enlarged detail of FIG. 1 and FIG. 2 show, the safeguarding device 20 comprises a base body 21 on which is provided at least one adhesion device 22 designed in the illustrated example as a separate magnetic film for temporary adhesion to the female die 6, wherein the adhesion can be released without the use of a tool. The safeguarding device 20 can therefore simply adhere to the female die 6, which is typically made of steel. The base body 21 and the adhesion device 22 are made of a material impermeable to light, thereby forming a blocking device for the detection ray 14.

On the base body 21, there is further provided a locating tab 23 projecting from the adhesion device 22, which locating tab 23 is in the illustrated example designed for a positive location of the safeguarding device 20 against the weight acting downwards on the safeguarding device 20 in the vertical direction. In addition, the locating tab 23 ensures that the safeguarding device 20 is not displaced downwards while a workpiece is placed on the female die 6 or if there are any vibrations.

The locating tab 23 of the safeguarding device 20 shown in FIGS. 1 and 2 is designed such that is has a contact surface 24 which is flat in the illustrated example and matched to an external surface 25 of the female die 6, which in the illustrated example is likewise flat at least in certain sections. Owing to the corresponding design of the contacting surfaces, the safeguarding device 20 is adequately aligned to the female die 6, so that the lowest detection ray 14 is reliably interrupted.

In the side view of a first embodiment of the receiving device of the monitoring device provided in FIG. 3, it can be seen how the individual radiation detectors 27 to 32, which may for example be discrete photo-diodes, are arranged and how they can be illuminated by corresponding detection rays 14. In the illustrated example, two each of the radiation detectors 27 to 32 are illuminated by one detection ray 14. The two first radiation detectors 27 and 28 are particularly important for the function of the monitoring device 7. In the closing movement direction 33, the second radiation detector 27 has the greatest distance from a diagrammatically indicated working edge 36 of a V-shaped male die 5. The position of the transmitting device 8 and the receiving device 9 is, by suitable displacement with the guide means 18 along the closing movement direction 33, adjusted such that a distance of the first radiation detector 28 from the working edge 36 in the closing movement direction 33 corresponds at least to the coast-down distance of the tool carrier 4. The safety margin 37 between the first and second radiation detectors 27, 28 is chosen such that the detection ray 14 no longer impinges on the second radiation detector 27 if the first radiation detector 28 is positioned immediately in front of a workpiece surface 38 indicated by a horizontal line in FIG. 3. FIG. 3 further shows a potential intervention direction 39 of a user into the safety and danger zones 40, 41 monitored by the radiation detectors 27 to 32. The danger zone is the region which is traversed by the male die 5 in the closing movement between the male and female dies 5, 6 and in which there is a risk of pinching. The safety zone 40 is the region in front of the danger zone 41 where a user intervention is to be detected in order to ensure a reliable stopping of the male die 5 before a body part of the user enters the danger zone 41.

In the embodiment of a receiving device 109 as shown in FIG. 4, the discrete photo-diodes used as radiation detectors in the embodiment of FIG. 3 are replaced by a detector matrix of detector cells arranged in a rectangular grid, the illustrated example comprising a CCD sensor (charge-coupled device). In the illustrated example, it is provided that the radiation detectors 127 to 132 are formed from pairs of adjoining detector cells. Such a detector matrix likewise enables the position of the detector cells used for monitoring purposes to be adjusted to the marginal machining conditions. It may further be provided that the detector cells are deactivated in the same way as the radiation detectors 27 to 32 of the embodiment shown in FIG. 3 as machining progresses, or they may be deactivated in a different way which may allow for improved adaptation to the machining process.

The die bending machine 1 can be operated as follows by way of example: first of all, there is a self-test of the light grid in a neutral position of the tool carrier 4, in which this is at a maximum distance from the machine bed 2 and from the female die 6 mounted thereon. In this process, it is checked whether the detector rays 14, when impinging on the radiation detectors 27 to 32, trigger corresponding signals. In addition, the transmitting and receiving devices 8, 9 of the light grid are positioned by the guide means 18 relative to the male die 5 mounted on the tool carrier 4. In this process, the geometry of the male die 5 and the coast-down distance of the tool carrier 4 are taken into account, so that the first radiation detector 28 is placed relative to the working edge 36 of the male die 5 in such a way that the distance between the first radiation detector 28 and the working edge 36 at least corresponds to the coast-down distance. Following the placement of the workpiece on the female die 6, the user can then initiate the machining process by operating the foot switch 15. This involves a pre-settable sequence of motions for the male die 5, which may for example include the following steps. In a first step after the operation of the foot switch 15, the tool carrier 4 is accelerated to a first speed of movement, which can also be referred to as "fast traverse" or "rapid traverse". During this fast movement, all radiation detectors with the exception of the second radiation detector 27 are monitored. If no interruption of any detection ray 14 is detected while the tool carrier 4 approaches the female die 6, the machine control unit 11, using the position signals of the position sensing system 12 and knowing the position of the light grid relative to the tool carrier, determines a point in time at which the detection ray 14 directed onto the first radiation detector 28 is only just not yet interrupted by the workpiece. At this point in time as determined by the machine control unit 11, a test signal is output to the monitoring device 7. On receiving the test signal, the monitoring device 7 checks whether on the one hand the detection ray 14 still impinges on the first radiation detector 28 and whether on the other hand the second radiation detector 27 is no longer hit by the detection ray 14. In this case only, which corresponds to a position of the working edge 36 of the male die 5 at a distance from the workpiece surface 38 which equals the coast-down distance of the tool carrier 4, does the monitoring device confirm a correct function of the die bending machine 1 and initiates a deceleration to a second speed of movement. In all other cases, for example if the detection ray 14 still impinges on both radiation detectors 27, 28 or if neither of the two radiation detectors 27, 28 is hit by the detection ray or of only the second radiation detector 27 is hit by the detection ray, the monitoring device 11 detects a malfunction and initiates a fast deceleration of the tool carrier 4 to a stop.

If the monitoring device has confirmed a correct function of the die bending machine 1, the two radiation detectors 28 and 32, which are located on a common first plane 34, and the radiation detector 31 are faded out. Furthermore, a timing element is started for the fadeout of the radiation detector 29 located in a second plane 35, the time to fadeout being chosen such that no interruption of the detection ray 14 directed on this radiation detector 31 by the workpiece is to be expected. If the speed of movement falls below a pre-settable value, a condition which is also referred to as "creep speed", the last radiation detector 30 can be faded out as well. From this time, it can be assumed that the gap between the male die 5 and the workpiece is closed completely and there is therefore no immediate risk of pinching. In the second, low machining speed, it can further be assumed that the potential dangers posed by the die bending machine 1 are minimal.

The invention claimed is:

1. A forming device comprising:
   a machine bed;
   a tool carrier supported on the machine bed in a manner capable of relative movement for mounting a tool;
   a drive device coupled to the tool carrier;
   a machine control unit for the control of the drive device; and
   a monitoring device designed for monitoring movements of the tool carrier and for providing a shutdown signal to a disconnecting device located upstream of the drive device on the occurrence of a pre-settable monitoring case,
   wherein the monitoring device comprises at least one radiation source and a plurality of radiation detectors arranged opposite the radiation source, and
   wherein at least a part of the beams emitted by the radiation source is oriented along a working edge of the tool, and
   wherein the monitoring device is designed to carry out a monitoring of an application of radiation to a plurality of radiation detectors by means of the monitoring device during an approach movement of the tool carrier towards the machine bed at a first speed of movement, wherein a first radiation detector is along a closing movement direction of the tool carrier arranged at a distance from the working edge of the tool which corresponds to a coast-down distance of the tool carrier following a disconnection of the drive device from the first speed of movement, and
   wherein the monitoring device is further designed to determine a position of the tool carrier along the closing movement direction by the machine control unit, and
   wherein the machine control unit is designed to provide a test signal to the monitoring device on reaching a pre-settable relative position determined by the machine control unit, and
   wherein the monitoring device is further designed to monitor the radiation applied to the radiation detectors, wherein a second radiation detector is arranged along the closing movement direction at a distance from the working edge of the tool which corresponds to a sum of the coast-down distance of the tool carrier following a disconnection of the drive device from the first speed of movement and a pre-settable safety margin, and
   wherein the monitoring device is further designed to provide the shutdown signal to the disconnecting device provided upstream of the drive device if at the time of the provision of the test signal no radiation of the beam is applied to the first radiation detector and/or if at the time of the provision of the test signal radiation of the beam is applied to the second radiation detector.

2. A forming device according to claim 1, wherein the machine control unit is designed in accordance with a first safety category of a safety standard, wherein the monitoring device and the disconnecting device form a safe operating system designed in accordance with a second safety category of the safety standard, the second safety category being at a higher level than the first safety category within the safety standard.

3. A forming device according to claim 1, wherein the machine control unit comprises a position sensing system for determining a relative position between the tool carrier and the machine bed and for providing a test signal on reaching a pre-settable relative position while the tool carrier approaches the machine bed.

4. A forming device according to claim 1, wherein the radiation detectors of the monitoring device, which are arranged opposite the radiation source and which are designed to detect the beams oriented along the working edge of the tool, are configured at least in pairs for the detection of a beam.

5. A forming device according to claim 1, wherein a first radiation detector is arranged along a closing movement direction of the tool carrier at a distance from the working edge of the tool which at least corresponds to a coast-down distance of the tool carrier following a disconnection of the drive device at a fast traverse speed of movement.

6. A forming device according to claim 5, wherein a second radiation detector is arranged along the closing movement direction of the tool carrier at a distance from the working edge of the tool which at least corresponds to a sum of the coast-down distance of the tool carrier following a disconnection of the drive device at the fast traverse speed of movement and a pre-settable safety margin.

7. A forming device according to claim 6, shutdown wherein the monitoring device is designed for the provision of the signal to the disconnecting device provided upstream of the drive device if no rays of a beam are applied to the first radiation detector on the arrival of the test signal and/or if rays of a beam are applied to the second radiation detector on the arrival of the test signal.

* * * * *